S. GREENSTONE.
AUTOMOBILE FENDER.
APPLICATION FILED DEC. 13, 1915.

1,331,910.

Patented Feb. 24, 1920.
3 SHEETS—SHEET 2.

INVENTOR
Samuel Greenstone
BY Kenyon & Kenyon
His ATTORNEYS

S. GREENSTONE.
AUTOMOBILE FENDER.
APPLICATION FILED DEC. 13, 1915.

1,331,910.

Patented Feb. 24, 1920.
3 SHEETS—SHEET 3.

INVENTOR
Samuel Greenstone
BY Kenyon & Kenyon
His ATTORNEYS

UNITED STATES PATENT OFFICE.

SAMUEL GREENSTONE, OF JERSEY CITY, NEW JERSEY.

AUTOMOBILE-FENDER.

1,331,910.　　　　　Specification of Letters Patent.　　Patented Feb. 24, 1920.

Application filed December 13, 1915. Serial No. 66,442.

*To all whom it may concern:*

Be it known that I, SAMUEL GREENSTONE, a citizen of the United States, and a resident of Jersey City, in the county of Hudson and State of New Jersey, have invented certain new and useful Improvements in Automobile-Fenders, of which the following is a specification.

My invention relates to fenders for motor vehicles and the like, and more particularly to fenders having an apron attachment adapted to drop in front of the vehicle and prevent persons or things that have been run into from passing under the wheels.

The purpose of my invention is to provide means that are simple and sightly whereby a net or apron that is normally compactly rolled or folded out of sight may be rapidly extended and firmly held in position as a fender or shield in front of the wheels, and to provide simple and efficient mechanism whereby the said apron may be dropped either by manually operated means located conveniently near the operator's position or by automatic means attached to the front of the vehicle. Further objects are to design and construct said automatic means in such a manner that the apron will be released and will fall into operative position regardless of the direction from which the blow is struck; to design and construct said manual operating means in such a manner that the apron may be released and dropped into operative position by the simple movement of a lever or pedal conveniently associated with the vehicle control devices, and further that the fender and apron may be restored to their normal closed position by operation of the same lever.

Another object of my invention is to provide a spring latch normally holding the fender in raised or folded position, and adapted to be tripped independently by said automatic means and by said manual means, the manual operating means being designed to engage the said latch only during a part of its movement, and at other times being disconnected therefrom so as to allow the latch to engage and hold the fender in normal position when it has been raised and restored thereto by the manual operating means.

Still another object is to provide mechanism adapted to prevent the fender from dropping into extended position when the vehicle is at rest, despite tripping of the latch by the said automatic means.

These and other objects and advantages will more clearly appear from the following detailed description taken in connection with the accompanying drawings which illustrate a preferred embodiment of the invention described in the appended claims.

Figure 1:
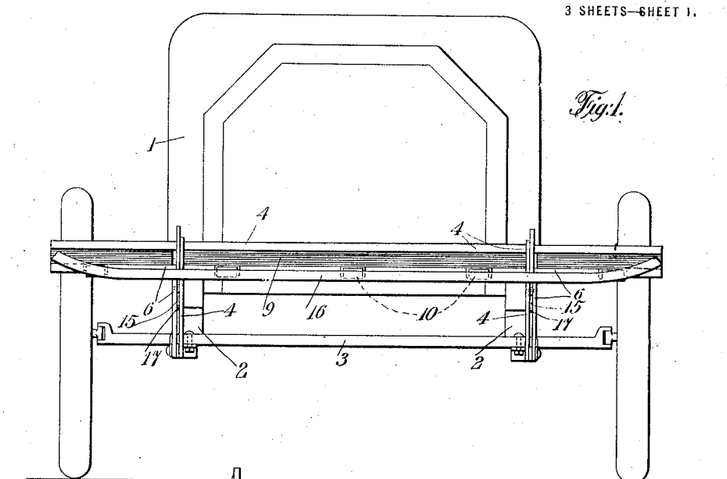
Figure 1 is a front view of one form of my invention as applied to a motor vehicle.
Figures 2, 13:
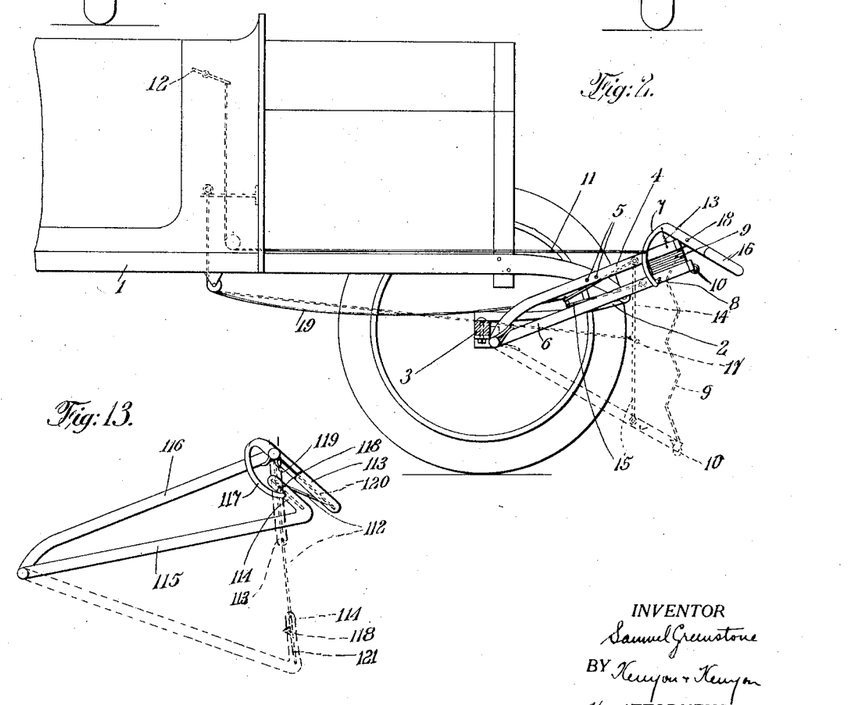
Fig. 2 is a side view of the same.
Fig. 13 is a side view of a modified fender apron.

Referring to Figs. 1 and 2, where I have shown in simple form a device embodying the combination of several of the novel features of my invention, the frame or chassis 1 of the vehicle is illustrated as being supported by springs 2 on front axle 3. A fender frame 4 is securely mounted on the frame 1, either by bolts 5, as illustrated, or by any other suitable means, such, for example, as compression springs, in order that the said frame 4 may act as a bumper in case of collision between the vehicle and a heavy object. Near the back of the frame 4 is pivoted a folding frame 6, normally held in closed or folded position by engagement of a latch 7, mounted on frame 4, with pin 8 on frame 6. Between the forward cross-bars of the two frames 4 and 6 is an extensible apron 9, normally compactly rolled or folded, but adapted to form a shield or apron in front of the vehicle when the frames are in their open or extended position. Since the upper frame is substantially rigidly mounted on the frame or chassis 1 of the vehicle, I preferably tilt it with the forward end above the back end, so that, when the folding frame 6 is lowered and the apron extended, the lower end of the apron will be slightly in advance of its upper end.

Suitable rollers 10 are mounted on the forward cross member of the frame 6 to lift the frame out of danger in case it strikes an uneven portion of the road. Elbow links 14 and 15, attached near the front of the folding frame 6 and fender frame 4, respectively, and pivoted to one another at 17, limit the distance through which the folding frame can drop when latch 7 releases the pin 8, and also prevents further downward motion of folding frame 6 when the apron comes into collision with a solid object.

The extension of the fender device can be manually controlled by means of flexible connection 11 and operating lever 12. I have also provided means whereby the extension of the fender apron may be automatically controlled. This automatic means may consist of a particular design and combination of the fender frame 4 and folding frame 6 whereby one is normally held somewhat in front of the other and is adapted on coming into contact with a solid object to move backward relatively to the other, thereby releasing the latching mechanism 7 and allowing the folding frame to fall into open position. But, although such an automatic releasing means is included within the scope of my invention, I preferably employ a contact bar 16, movably mounted or pivoted on the fender frame 4. In the embodiment illustrated in Figs. 1 and 2, this contact bar is shown as pivoted on frame 4, so that its forward end is adapted to swing downward but not upward. Suitable springs 13 tend to hold the forward edge of the contact bar up and so normally keep the latch 7, which may be rigidly attached to the contract bar back of the pivots 18, in engagement with pin 8. When the contact bar comes in collision with an object at the front or sides, it is obvious that it will tend to swing downward about the pivot pins 18, thereby lifting latch 7 away from the pin 8 and releasing the folding frame 6. The advantage of using such a contact bar lies in the fact that the apron 9 and frame 6 have an appreciable time in which to extend after the object collides with the contact bar and before it is struck by the apron-carrying frames. By suitably mounting the latching mechanism 7 on the frame 4 in operative relation with the contact bar 16, the latter may be made removable, to allow the operator to rely solely on the manual controlling means, if he desires so to do. I also prefer to mount the contact bar in a downward tilting position, in order that the point of collision may be as near the ground as practicable, and that the effect of collision will be to swing the contact bar 16 downward, as above described.

To restore the folding frame to its normal closed position, I have provided a flexible connection 19, attached to the pivot 17, whereby the operator may draw the pivot 17 to the rear, thus raising the folding frame into its normal or closed position, where the pin 8 will come into engagement with the latch 7 and so secure it in readiness for another operation.

In the preferred and modified form of my invention shown in Figs. 3 to 12, I have provided a vehicle fender apparatus which may be operated manually or automatically, and these manual and automatic operating means may exist independently or in combination in the same device. The automatic means is adapted to extend the fender into working position, regardless of the direction from which the blow is struck; and the manual means is adapted to be used, if so desired, with mechanism operated by the same lever or pedal for raising the fender and restoring it to its normal closed position; and may also be used with a locking means available only when the vehicle is at rest, for keeping the fender raised regardless of efforts to extend it by any other means. The following concise description of a device in which all these features are combined is intended as illustrative only and not at all as limiting thereto the invention claimed.

Referring to said Figs. 3 to 12, the vehicle frame 20 is carred upon the front axle 21 by suitable springs 22. The fender frame 23 may be either rigidly bolted to the frame 20 as illustrated, or it may be mounted upon any suitable compression springs adapted to absorb the shock of a collision between the vehicle and another object. The fender frame comprises two longitudinal members 24 and 25 secured to the frame 20, and a fender or bumper bar 26 extending across the full width of the vehicle in front of the wheels. This bumper bar also acts as an apron-containing member, and for that purpose is preferably tubular in shape, having a longitudinal slot throughout its entire length in the bottom thereof to allow the apron 27, which is normally rolled up inside the bumper bar 26, to be drawn out and extended in position by the operation to be hereafter described. The apron is normally rolled up on rolls 28, 29, coupled together by a universal joint 30 at the mid point 110 of the bumper bar 26. The rolls 28 and 29 are supported at their outer ends by journals 31, and are equipped with springs 32 normally tending to revolve the rolls 28, 29, and thereby to roll up the apron 27.

Figure 3:
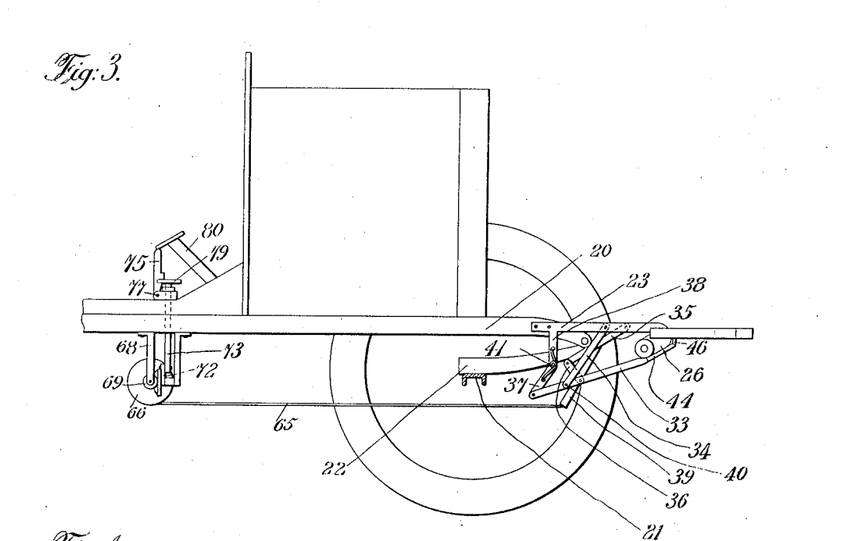
Fig. 3 is a side view of a modified form of my invention showing the apparatus in closed or normal position.
Figure 4:
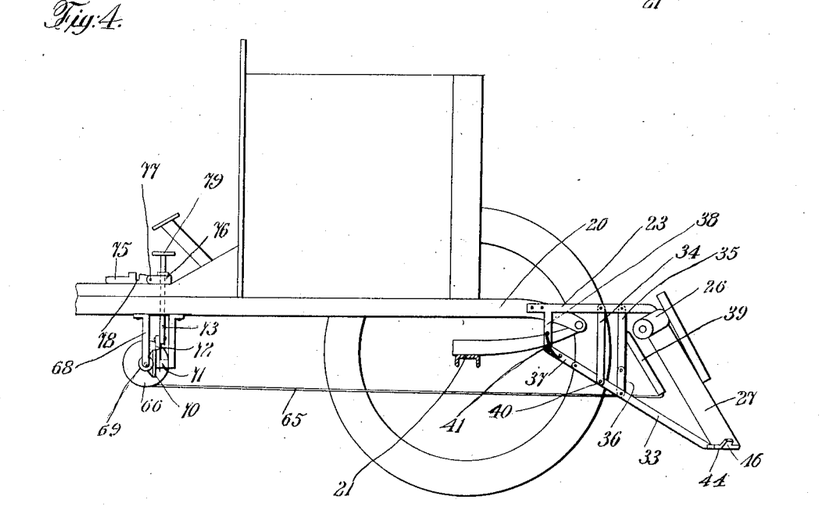
Fig. 4 shows the same device in extended or operative position.
Figures 5, 6, 7, 8, 9, 10, 11, 12:
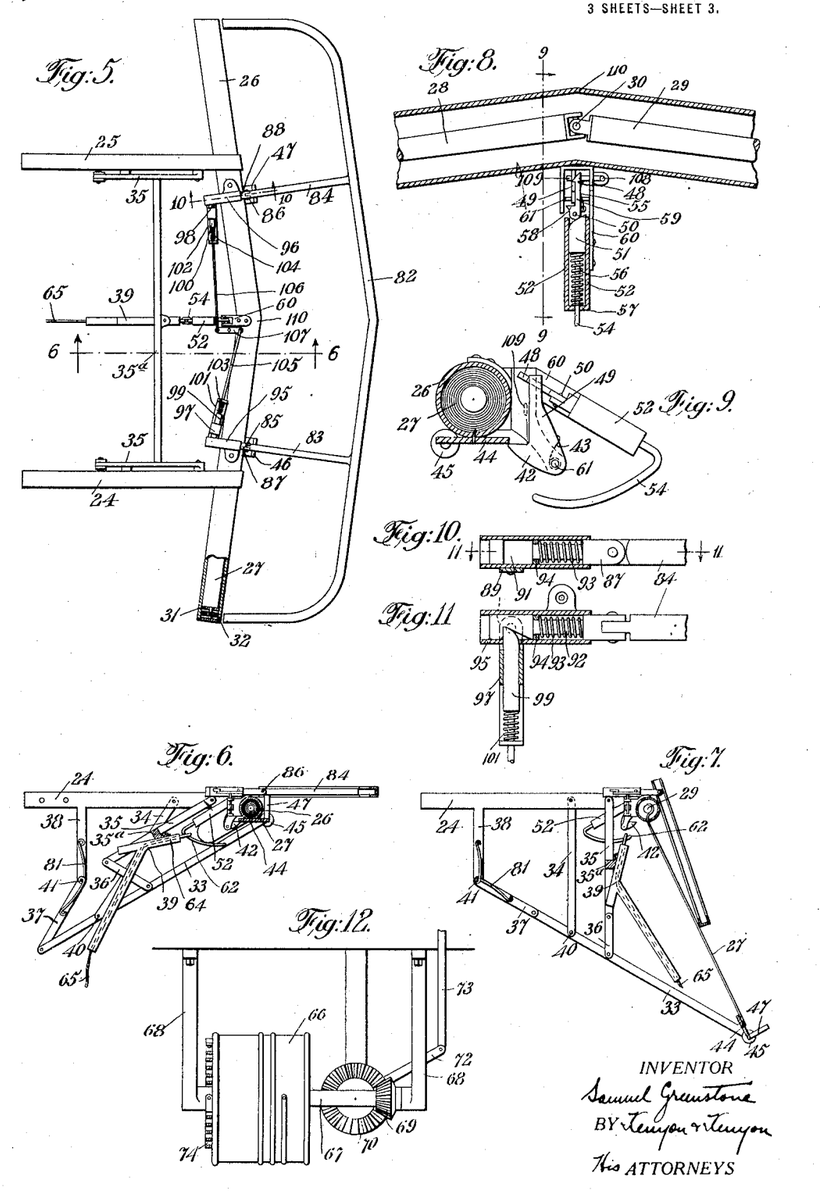
Fig. 5 is a top view of the device shown in Fig. 3, a part of the fender frame being broken away.
Fig. 6 is a detail side view on line 6—6 of Fig. 5.
Fig. 7 is a detail side view on the same line showing the device in extended position.
Fig. 8 is a top view of a detail of Fig. 5 partially in section.
Fig. 9 is a cross-sectional view of a detail of the device on line 9—9 of Fig. 8.
Fig. 10 is a sectional view of a detail of the device on line 10—10 of Fig. 5.
Fig. 11 is a sectional view of a detail of the device on line 11—11 of Fig. 10.
Fig. 12 is an enlarged rear view of a detail of the device.

The folding frame 33 is swingingly supported upon the fender frame 23 by means of a plurality of pairs of links so proportioned that when the folding frame is folded in its normal raised position, its forward edge is substantially under the bumper bar 26, and when in open or extended position, its forward edge is in advance of the bumper bar 26 and slightly above the ground. These links are likewise so proportioned and placed that when the folding frame is in its lowest position it is locked against backward movement relatively to the fender frame, and at all times resists backward movement unless accompanied by upward movement of the said folded frame 33. As illustrated in Figs. 3, 4, 6 and 7, these links consist of the radius rods 34, elbow links 35 and 36, and links 37, the links 37 connecting the back part of the folding frame 33 with the vertical arms 38 of the fender frame 23. A hollow lever arm 39 is rigidly attached to the elbow link 35 by a cross rod 35ª in such a manner that when the device is in open or extended position (Figs. 4 and 7,) the backward movement of the lever arm 39 causes the elbow link 35 to raise the small link 36 thereby lifting the front end of the folding frame and throwing the rear end thereof downward about the lower end 40 of the radius rod 34 as a pivot. Further backward movement of the crank arm 39 raises the front end of the folding frame 33 still higher, allowing the rear end thereof to describe an arc having the upper end 41 of link 37 at its center and the length of link 37 as its radius, while the point 40 is carried backward and upward by the radius rod 34. In its uppermost or normal position, the forward end of frame 33 comes directly under the bumper bar 26, where it is normally held by a latch 42 under pressure of spring 43 (Fig. 9).

The lower end of the apron 27 is attached to the forward cross member 44 of the folding frame 33, and at the front edge of this cross member are mounted a plurality of rollers 45 to bear upon uneven raised portions of the road when the device is extended. Two arms 46 and 47 are formed at right angles to the forward cross member 44, for the purpose of supporting the contact bar, as hereafter described.

It will be apparent from what has already been said that when the device is in its normal closed position, the apron 27 will be folded or rolled out of sight within the tubular bumper bar 26 and the folding frame 33 will be raised into a position substantially under that of the fender frame 23 and at such a height as to easily clear any inequalities in the road.

I have illustrated two methods for releasing the latch 42, either or both of which may be employed. The method which I will first describe is that by which the latch 42 is manually released. This method preferably comprises a hook 48 (Fig. 8) normally engaging the head 49 of the latch 42 and pivoted at 50 to the block 51 which is adapted to slide longitudinally in the sleeve 52 and is operated by the rod 54. A light spring 55 mounted on the block 51 tends to keep the hook 48 pressed toward the head 49 of the latch 42. A spiral spring 56 compressed between block 51 and end-plate 57 of the sleeve 52 tends to throw the block toward the latch and so keep the hook 48 engaged with the latch head 49. A cam offset 58 formed on the same side of the shank 59 as the hook 48 is adapted to engage the sleeve 52 after the block 51 has traveled a predetermined distance toward the end-plate 57. The effect of the engagement of the cam offset 58 with the sleeve 52 is to rock the shank 59 and hook 48 on the pivot 50, thereby releasing the latch head 49 and allowing the same to resume its normal forward position under pressure of the spring 43.

The sleeve 52 is rigidly supported on the bumper bar 26 by the frame 60 which also supports the pin 61 upon which the latch 42 is pivoted. The rear end of the rod 54 is bent downward in an arc following the line of travel of the loop 62 which engages therewith. This loop is formed on the forward end of a rod 64 which is adapted to slide longitudinally within the crank arm 39. A flexible connection 65, secured to the rod 64 and adapted to pass through the hollow crank arm 39, is carried from the lower end of the crank arm to any suitable and convenient manual operating mechanism. In Figs. 3, 4 and 12 I have illustrated a preferred form of such an operating mechanism. It comprises a drum 66 mounted on shaft 67, said shaft being supported by suitable hangers 68 and having rigidly mounted thereon a pinion 69. This pinion engages the beveled gear 70 suitably mounted on shaft 71 upon which is also keyed a crank arm 72. A foot pedal 73 conveniently located near the vehicle-control devices, engages with this crank arm 72 and is adapted to wind up the flexible connection 65 on the drum 66 on being pressed downward. A suitable spring 74 having one end attached to the hanger 68 and the other to the drum 66, tends to keep the flexible connection taut, and consequently keeps the foot pedal 73 normally in lowered position. I have also provided a lock whereby the foot pedal may be kept in this position when the vehicle is not being operated. This lock comprises a member 75 pivoted to a collar 76 and normally lying on the floor of the car out of the way. When it is desired to lock the fender in folded position, the member 75 may be lifted about the pivot 77, the notch 78 engages with the cap 79 of the foot pedal 73 and the head of the member 75 comes into contact with the clutch pedal 80. So long as the member 75 remains in that position, the clutch pedal cannot be operated, nor can the folding frame 33 be dropped into extended position, because the flexible connection 65 tightly wound on the drum 66 makes it impossible for the crank arm 39 to move forward, and thereby prevents the elbow link 35 from moving toward its open position shown in Fig. 4. The spring 56 in the sleeve 52 is made strong enough to overcome the tendency of the flexible connection 65 to slide through the hollow crank arm 39, when the weight of the folding frame 33 is thrown on such flexible connection by reason of unintentional or mischievous tripping of the latch 42.

From the above description it will appear that latch 42 may be manually operated by the exertion of pressure on the foot pedal 73, thereby moving the crank arm 72 below its normal position shown in Fig. 3, turning the shaft 71 and beveled gear 70, revolving the pinion 69, shaft 67 and drum 66, and bringing a greatly increased pressure to bear upon the flexible connection 65. This pressure is transmitted through the said flexible connection 65 to the block 51 which is thereby moved toward the end-plate 57, compressing the spring 56 and drawing the hook 48 with it. The distance between the cam offset 58 and the sleeve 52 is made great enough so that latch 42 will move out of engagement with the forward cross member 44 on the folding frame 33 before the hook 48 is rocked out of engagement with the latch head 49. By now rapidly removing pressure from the foot pedal 73, the hollow crank arm 39 is allowed to move forward, thereby dropping the cross member 44 out of position for engagement with the latch 42 before the same release in tension on the loop 62 and rod 54 will allow the hook 48 and latch 42 to spring back into their normal positions. As the folding frame 33 now drops rapidly into its open or extended position shown in Figs. 4 and 7, by the operation of gravity and the tension of the strong spring 81 the hollow crank arm 39 moves forward, carrying with it the flexible connection 65 and raising the foot pedal 73 through the mechanism heretofore described.

When it is desired to restore the folding frame and apron to their normal closed or folded positions, however, it is only necessary to press down the foot pedal 73. As a result thereof, the flexible connection 65 draws the hollow crank arm 39 toward the rear, as previously described, and brings the folding frame 33 to its normal raised position shown in Figs. 3 and 6. It will be noted, however, that the pressure on foot pedal 73 necessary to raise the folding frame 33 against the influence of gravity and the pressure of the strong spring 81, is so great that the block 51 slides toward the end-plate 57, the cam offset 58 engages the sleeve 52, the hook 48 is rocked to the right out of engagement with the latch head 49, the spring 43 brings the latch to its normal engaging position where it is ready to engage and hold the forward cross member 44 of the folding frame 33 as soon as the same has been brought to its normal folded position by the winding up of the flexible connection 65 on the drum 66.

In the mechanism just described it will be seen that my invention combines, with the manual operating means, a manual restoring means, which necessitates the use of only one operating lever or pedal, and also provides convenient means whereby any operation of the device may be prevented when the vehicle is not in use, and likewise preventing any operation of the vehicle unless and until the fender device is unlocked and ready for use, it being assumed that the motor vehicle in connection with which this description is made would not and could not normally be operated without the use of the clutch pedal.

A preferable method of releasing the latch 42 by automatic means may be described as follows:—The contact bar 82 is supported by arms 83 and 84 horizontally pivoted at 85 and 86 to the square rods 87 and 88, which are adapted to slide longitudinally in the sleeves 95 and 96 pivotally mounted on the bumper bar 26. Square rod 87, shown in detail in Figs. 10 and 11, is composed of two main portions, the forward portion being pivoted to the supporting arm 83 as aforesaid, and the rear portion 89 having on its inner face a cam-shaped notch 91, and intermediate the two portions a shank 92 of reduced diameter around which may be placed the thrust spring 93 bearing at its forward end upon the forward portion of the rod 87 and at its rear end upon internal collar 94 made integral with the sleeve 95. The construction of square rod 88 and sleeve 96 is symmetrically the same as that of the square rod 87 and sleeve 95 just described. Hollow arms 97, 98 project inwardly from the sleeves 95 and 96 at points substantially opposite the cam notches 91. Push rods 99 and 100 are adapted to slide longitudinally within the hollow arms 97, 98, and have at their outer ends cam-shaped surfaces adapted to engage with the cam notches 91. Yokes 101, 102 and springs 103, 104 tend to keep the push rods 99 and 100 in close engagement with the said cam notches, and rods 105, 106 connect the said push rods with the latch-operating member 107. This latch-operating member comprises a T-shaped pivot pin 108 mounted on the frame 60, the rods 105, 106 being pivoted to the same at opposite ends of the T-shaped head, respectively. A crank arm 109 rigidly attached to the lower end of the member 108 normally rests against the front face of the latch head 49 and is adapted to trip the latch 42 by moving the said latch head toward the rear.

It will be seen from the above description that as the contact bar 82 is moved directly backward, the square rods 87, 88 tend to compress the thrust springs 93 and to move the rear portions 89 back of their normal position. As the cam notches 91 are thus pushed backward, they force the push rods 99 and 100 inward against their respective springs 103, 104, thereby turning the T-shaped pivot 108 counter-clockwise, and forcing the rigid crank arm 109 backward against the latch head 49 sufficiently to release the latch 42. The folding frame will immediately tend to drop into its extended position, being opposed only by the pressure of spring 74 on the drum 66; but this pressure is limited to that which is necessary to take up the slack in flexible connection 65 and thus does not seriously oppose the action of gravity or the pressure of the strong spring 81. However, if the locking device 75 is in its raised and locked position shown in Fig. 3, the foot pedal will be unable to rise and will prevent the drum 66 from unwinding or the crank arm 39 from moving forward from its normal position. The automatic latch tripping means, therefore, while it is independent of the manual tripping means, is nevertheless controlled by the latter when the locking device 75 is in use; and by this means I am enabled to prevent the dropping of the folding frame 33 to extended position when the vehicle to which the fender is attached is not in use or is standing still.

I have described the manner in which the automatic tripping means releases the latch when the contact bar is struck squarely from the front. In case the blow should come from the side, the contact bar will naturally move away from the point of collision, thereby pivoting the sleeves 95 and 96 on their respective pivot points. As a result of this pivoting, one of the cam notches 91 will tend to draw away from its respective push rod while the other cam notch will be forced toward its respective push rod. The springs 103, 104, are adapted to allow the push rods 99 and 100 to be withdrawn from their respective cam notches 91, but there is no compression element between the push rods and the points where they are pivoted to the T-headed pin 108. It follows that no matter which way the contact bar 82 is moved by the collision, the resulting movement of the T-headed pin 108 will always be in a counter-clockwise direction, and a sufficient movement of the member 108 will result in the tripping of the latch 42 by pressure of the crank 109 on the latch head 49 and the consequent extension of the folding frame 33 and apron 27. The arms 46 and 47, heretofore mentioned in connection with the forward cross member 44 of the folding frame 33, are adapted to engage the supporting arms 83 and 84 at a point in front of the pivots 85 and 86, and to normally hold the supporting arms 83 and 84 in a substantially horizontal position. When the folding frame 33 drops to its extended position, however, the supporting arms 83 and 84 drop about the pivots 85 and 86 and the contact bar 82 falls in front of the extended apron 27. When the device is restored to its normal position, the contact bar 82 is carried outward by the rollers 45 far enough to prevent its being caught by the arms 46 and 47, and is carried back to its normal position by means of the said arms 46 and 47 coming into contact with the supporting arms 83 and 84 as the folding frame 33 moves toward its normal raised position.

I also preferably make my apron 27 and apron-holding members 26 and 44 of such shape and size that the apron when extended will be of "cowcatcher" shape, as indicated in Figs. 3, 4 and 5. Such a construction has the important function of tending to thrust aside obstacles that come against the fender and apron, rather than of pushing them along in front of the vehicle, and, in order to give the apron this peaked or cow-catcher shape, and at the same time to allow it to be smoothly rolled within the container 26 when in closed position, I have made a suitable bend or angle in the said container at its mid-point 110, tilted it into a plane substantially at right angles to the line of intersection 111 of the two planes formed by the extended apron, and made the rollers 28 and 29 of greater diameter at their adjacent ends, so that the apron will roll up evenly despite the fact that it is longer in the middle than at the sides. The forward cross member 44 is likewise suitably bent and suitably mounted on the folding frame 33, so that when the latter is in its lowered position the cross member 44 is substantially horizontal. Any other desirable means for accomplishing this result may be employed.

In Fig. 13 I have show a modification of of my extensible apron adapted to be used in combination with any of the features heretofore described. In this modification the apron 112″ extends from the lower end of the contact bar 113 to the upper end of a member 114 mounted at the front of folding frame 115. The contact bar 113 is pivotally mounted on fender frame 116 similarly to the device shown in Fig. 2, and a latch 117 may be attached to the rear end of the said contact bar 113 to engage pin 118 on member 114 in the same manner that latch 7 of Fig. 2 is mounted on the contact bar 10 to engage with pin 8 on frame 6. A suitable spring 119 tends to keep the latch in engagement and the front part of the contact bar in its normal raised position. A net or apron 120 is held firmly between the contact bar 113 and fender frame 116, and a similar net 121 is similarly held between member 114 and folding frame 115 so that when the latch 117 is moved automatically or manually to release the pin 118, thereby allowing the folding frame 115 to drop into its extended position, there will be a continuous apron or shield extending from the forward cross member of frame 115 up to the forward cross member of fender frame 116, having division or folding lines at the points where it is attached to the contact bar 113 and member 114. In such an arrangement the cross-bars of the contact bar 113 and member 114 are preferably made of resilient material such as spring steel so as to lessen the severity of collision between the extended apron and the body to be warded off. Among the advantages of such an arrangement are that the contact bar forms part of the extensible apron and so does not interfere with the functions of the apron, and that when the device is in closed or folded position no auxiliary means are required for taking up slack in the apron. Such an arrangement is simpler and less liable to injury than the more complicated automatic tripping means described above.

Throughout this description I have used the words or phrases, "folding frame", "apron", "latch", etc., for the sake of clearness in identification of parts, but I do not intend to limit myself thereby to the strict definition of the terms. For example, by "folding frame", I intend to express that extensible or movable part of a fender apparatus which guides the apron to extended position and supports it there; by "apron" I intend to include any guard, shield, net or protective material adapted to connect the parts of the extensible fender frame; by "latch" I means any mechanism for holding the members of the device in one position and operatively connected with the controlling means to allow the members to move into another position.

And so, in general, while I have described my invention in great detail with reference to the particular embodiment which I have found preferable, I do not wish to be understood as intending to limit my invention in any way to the details described, for it will be apparent to those skilled in the art, after understanding my invention, that many changes, omissions, substitutions and modifications may be made in the construction and operation of my novel features and combinations without departing from the spirit of the invention as described in the following claims.

Having thus described my invention, what I claim as new and desire to secure by Letters Patent, is:—

1. In vehicle fender apparatus, the combination of upper and lower fender frames which project farther forward at the center than at the sides, the lower frame being swingingly mounted on the upper, an apron extending between the frames, and mechanism whereby the lower frame may be dropped at the proper moment thereby extending the apron in a projecting bow or arc in front of the vehicle.

2. In vehicle fender apparatus, the combination of an upper and lower frame, the lower frame being swingingly mounted on the upper, an apron extending between the frames, means adapted to take up the slack in the apron when the frames are moved together, and mechanism whereby the lower frame may be dropped at the proper moment thereby extending the apron in a projecting bow or arc in front of the vehicle.

3. In vehicle fender apparatus, the combination of a frame mounted on the vehicle having a bumper bar at its forward end, a lower frame swingingly supported by the said first mentioned frame, an apron extending between the forward edge of the lower frame and the bumper bar, means for taking up slack in the apron when the frames are moved together, and mechanism whereby the lower frame may be swung away from the upper frame thereby extending the apron in a projecting bow or arc in front of the vehicle.

4. In vehicle fender apparatus, the combination of a fender frame, a folding frame supported thereby, an extensible apron between the two frames, a latch adapted to hold the folding frame in folded position, and manual means for releasing said latch whereby the apron is extended in a projecting bow or arc in front of the vehicle.

5. In vehicle fender apparatus, the combination of an extensible apron frame which extends farther forward at the center than at the sides, means for extending it, and mechanism for restoring it to its normal closed position.

6. In vehicle fender apparatus, the combination of a fender frame, a folding frame supported thereby, an extensible apron between the two frames, a latch adapted to hold the folding frame in folded position, means for releasing said latch, and mechanism for restoring the folded frame to its normal latched position.

7. In vehicle fender apparatus, the combination of folding fender frames which project farther forward in the center than at the sides normally held in folded position by a suitable latch, an extensible apron connecting the two frames, and a contact bar movably mounted on the one frame and adapted to release the said latch on being struck from the front or sides whereby the apron is extended in a bow or arc.

8. In vehicle fender apparatus, the combination of a fender frame, a folding frame swingingly supported thereby but normally held in folded position by a suitable latch, an extensible apron connecting the two frames, a contact bar movably mounted on the fender frame and adapted on being struck to release the said latch, and means for restoring the folding frame and apron to their normal positions.

9. In vehicle fender apparatus, the combination of a fender frame, a contact bar movably mounted thereon and a folding frame swingingly supported thereby, an extensible apron between the two frames, a spring latch on the fender frame adapted to keep the folding frame normally in folded position, and means whereby the latch is released on movement of the contact bar toward the rear or sides.

10. In vehicle fender apparatus, the combination of a fender frame substantially rigidly attached to the vehicle, a folding frame supported by the fender frame, an extensible apron between the two frames, a latch adapted to hold the folding frame in folded position, means for releasing said latch, and mechanism for restoring the folded frame to its normal latched position.

11. In vehicle fender apparatus, the combination of a fender frame comprising side bars attached to the vehicle, and an apron-containing member, a latch mounted on said frame, a folding frame normally held in folded position by said latch, an extensible apron held within said apron-containing member and having its lower edge attached to the folding frame, means for releasing the said latch, and mechanism for restoring the folding frame to its normal latched position.

12. In vehicle fender apparatus, the combination of a fender frame substantially rigidly attached to the vehicle, a folding frame swingingly supported by links so proportioned that when the folding frame is in folded position its forward edge is substantially under the forward edge of the fender frame, and when in extended position its forward edge is in advance of the forward edge of the fender frame, an apron extending between the two frames, and means for raising and lowering the folding frame relatively to the fender frame.

13. In vehicle fender apparatus, the combination of a fender frame, a folding frame swingingly suspended therefrom by links so proportioned that the folding frame is carried downward and forward relatively to the fender frame on being moved away therefrom, an extensible apron between the two frames, and means for raising and lowering the folding frame relatively to the fender frame.

14. In vehicle fender apparatus, the combination of a fender frame substantially rigidly mounted thereon, a folding frame swingingly suspended from the fender frame by links so proportioned that when the folding frame is being lowered it is locked against backward movement with respect to the fender frame, an apron extending between the two frames, and means for raising and lowering the folding frame relatively to the fender frame.

15. In vehicle fender apparatus, the combination of a fender frame, a folding frame suspended therefrom by a plurality of pairs of links which normally hold the said folding frame in folded position under the fender frame but are adapted to carry said folding frame downward, the said links at all times resisting backward motion of the said folding frame unless accompanied by upward motion thereof, an extensible apron connecting the two frames, and means for raising and lowering the folding frame relatively to the fender frame.

16. In vehicle fender apparatus, the combination of a fender frame substantially rigidly mounted thereon, a folding frame suspended from the fender frame but normally held in folded position, an extensible apron connecting the two frames, a contact bar movably mounted on the fender frame and operatively connected to control the extension of the said folding frame on movement of the contact bar to the rear or sides relatively to the fender frame.

17. In vehicle fender apparatus, the combination of fender frames which project farther forward at the center than at the sides, an extensible apron connecting the two frames, and a latch normally holding them together in closed position, the said latch being adapted to be tripped by independent automatic and manual means.

18. In vehicle fender apparatus, the combination of fender frames, an extensible apron in the form of a bow or arc connecting the two frames, and a latch normally holding them together in closed position, the said latch being adapted to be tripped automatically in case of collision between the apparatus and another object, said frames being held rigid in operative position against rearward movement.

19. In vehicle fender apparatus, the combination of fender frames, means normally holding the frames together in closed position, and mechanism controlling the extension of the said frames when struck from the front or sides.

20. In vehicle fender apparatus, the combination of fender frames, a latch normally holding the frames together in closed position, a contact bar movably mounted on one of the frames, and means for tripping said latch upon movement of the contact bar to the rear or sides relatively to the said last mentioned frame.

21. In vehicle fender apparatus, the combination of an extensible apron-carrying frame, mechanism comprising a latch for holding said frame in folded position, and contact means movably mounted on said frame and adapted to trip said latch on movement of the contact means to the rear or sides relatively to the frame.

22. In vehicle fender apparatus, a latch-operating mechanism comprising a hook normally engaging the latch, operating means pivotally connected to the shank of the hook, a cam offset on one side of the shank, and a member rigidly mounted on the apparatus and adapted to engage the said cam offset after a predetermined amount of travel of the operating means, thereby rocking the said hook on the said pivot and disengaging the said latch.

23. In vehicle fender apparatus, a latch independently operated by automatic and manual means, the said automatic means comprising a contact bar movably mounted on the apparatus and operatively connected to trip said latch upon movement of the contact bar relatively to the apparatus, the said manual means comprising a slidable hook adapted to engage the said latch during a part of its travel only.

24. In vehicle fender apparatus, a latch-operating mechanism comprising a hook normally engaging the latch and pivotally connected to a sliding block, guide plates for the said block, a cam offset on the hook shank adapted to engage one of the said guide plates after a predetermined amount of travel of the said block thereby rocking said hook and disengaging said latch, a spring tending to throw said block in the direction of said latch, and means for moving the block away from the latch.

25. In vehicle fender apparatus, a latch-operating mechanism comprising a slidable hook adapted to engage and move the latch during part of its travel and to be disengaged from the latch during the remainder of its travel, a spring tending to move the hook toward the latch, and means attached to the hook and adapted to be manually operated to draw said hook away from the latch.

26. In a vehicle fender apparatus, the combination of a fender frame, a folding frame supported thereby, an extensible apron between the two frames, means for holding the frames in normal folded position, independent automatically and manually controlled means for extending the apparatus, means for restoring the folding frame to normal position, and means for locking the apparatus in folded position when the vehicle is not in operation.

27. In vehicle fender apparatus, the combination of a fender frame, a folding frame supported thereby, an extensible apron between the two frames, a latch holding the frames in normal folded position, means for tripping the said latch, and means for locking the apparatus and preventing its operation.

28. In vehicle fender apparatus, the combination of an extensible apron and frames therefor, automatic and manual means for operating the same, a latch to hold the same in closed position, and a locking device to prevent operation.

29. In vehicle fender apparatus, the combination of an extensible apron and frames therefor, the frames being farther forward at the center than at the sides so that the apron, when extended, projects forward in a bow or arc, automatic and manual means for operating the same, and mechanism for restoring the same to its normal closed position.

30. In vehicle fender apparatus, the combination of an extensible apron and frames therefor, and a single means manually operated to control both the extension and the restoration to normal position of the fender apparatus.

31. In vehicle fender apparatus, the combination of a fender frame, a folding frame supported thereby, an extensible apron between the two frames, a latch normally holding them in folded position, and latch-operating and position-restoring means comprising a tension device that engages the latch during a part of its operation only and affects the folding frame during the rest of its operation.

32. In vehicle fender apparatus, a latch-operating mechanism comprising a contact bar, pivoted slidable supporting arms having cams thereon, rods bearing on said cams and operatively connected to trip the latch upon movement of the contact bar relatively to the apparatus.

33. In vehicle fender apparatus, the combination with a vehicle of an extensible apron and frames therefor, a latch normally holding the frames in closed position, and latch-operating means comprising a contact bar movably mounted on the said frames and adapted to trip the said latch on being struck from the front or sides.

34. In vehicle fender apparatus, the combination with a vehicle of an extensible apron and frames therefor, a latch normally holding the frames in closed position, and latch-operating means comprising a contact bar movably mounted on said frames and adapted by the combined use of cams and rods to trip the said latch whenever the contact bar moves relatively to the said apron frames.

35. In vehicle fender apparatus, the combination of an extensible apron and frames therefor, a contact bar adapted to operate the said extensible apron, means for dropping the contact bar when the extensible apron is extended and for restoring the contact bar to its normal position on restoration of the apron to normal raised position.

36. In vehicle fender apparatus, the combination of an extensible apron carried between a fender frame and a folding frame, a contact bar movably mounted on the fender frame by horizontally pivoted supporting arms, means adapted to hold the said supporting arms in normal position when the folding frame is in its raised position, and means coöperating with the said contact bar to raise it into normal position at the same time that the folding frame is being restored from extended to normal raised position.

37. In vehicle fender apparatus, the combination with a vehicle of an extensible apron and frames therefor, a latch normally holding the frames in closed position, and latch-operating means comprising a contact bar, pivoted slidable supporting arms having cams thereon, rods bearing on said cams and connected at their inner ends to the opposite arms of a T-headed pivot, the said pivot having a rigid crank arm operatively engaging the latch, whereby a blow to the contact bar from the front or sides will produce revolution of the T-headed pivot only in that direction which results in the tripping of the latch.

38. In vehicle fender apparatus, the combination with a vehicle of an extensible apron and frames therefor, a latch normally holding the frames in closed position, a crank arm engaging the said latch and operated by a T-headed pivot, a contact bar movably mounted on the frames and operatively connected to revolve the T-headed pivot in that direction only which causes tripping of the latch on movement of the contact bar relatively to the frames.

39. In vehicle fender apparatus, the combination with a vehicle of an extensible apron and frames therefor, a latch normally holding the frames in closed position, and latch-operating means comprising a contact bar movably mounted on said frames and adapted to operate said latch on being struck from the front or sides.

40. The combination of a fender frame adapted to be substantially rigidly mounted on a vehicle, a folding frame supported by said fender frame, and an extensible apron between them, the said folding frame being adapted at all times to resist backward motion thereof relatively to the fender frame unless accompanied by upward motion of the folding frame with respect thereto.

41. In vehicle fender apparatus the combination with fender frames of an extensible apron comprising three parts, one part being substantially rigidly supported on one frame, the second part being substantially rigidly supported on the second frame, and the third part connecting the first and second parts.

42. In vehicle fender apparatus the combination with a fender frame and folding frame of a contact bar mounted on the fender frame, an apron frame mounted on the folding frame, and an apron connecting the contact bar and apron frame.

43. In vehicle fender apparatus the combination with a fender frame and folding frame of a contact bar mounted on the fender frame, an apron between the contact bar and the folding frame, the said contact bar being adapted to swing substantially into line with the apron when the fender is extended.

44. In vehicle fender apparatus the combination of an extensible apron and frames therefor, means for operating same, and a locking device adapted to lock the fender apparatus in closed position when the vehicle is not in operation, and to prevent operation of the vehicle when the fender apparatus is locked in closed position.

45. The combination of a fender frame adapted to be substantially rigidly mounted on a vehicle, a folding frame and an extensible apron between them, the said folding frame being adapted at all times to resist backward motion thereof relatively to the fender frame unless accompanied by upward motion of the folding frame with respect thereto.

46. In a vehicle fender apparatus, the combination of a fender frame and a folding frame, the folding frame being adapted at all times to resist backward motion thereof relatively to the fender frame unless accompanied by upward motion of the folding frame with respect thereto.

In testimony whereof, I have signed my name to this specification.

SAMUEL GREENSTONE.